United States Patent
Zhang et al.

(10) Patent No.: US 10,903,487 B2
(45) Date of Patent: Jan. 26, 2021

(54) METAL-METAL BATTERY

(71) Applicant: Toyota Motor Engineering & Manufacturing North America, Inc., Erlanger, KY (US)

(72) Inventors: Ruigang Zhang, Ann Arbor, MI (US); Chen Ling, Ann Arbor, MI (US); Fuminori Mizuno, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 1237 days.

(21) Appl. No.: 13/870,799

(22) Filed: Apr. 25, 2013

(65) Prior Publication Data

US 2014/0322597 A1 Oct. 30, 2014

(51) Int. Cl.
| | |
|---|---|
| *H01M 10/054* | (2010.01) |
| *H01M 4/38* | (2006.01) |
| *H01M 4/58* | (2010.01) |
| *H01M 10/056* | (2010.01) |
| *H01M 10/36* | (2010.01) |

(52) U.S. Cl.
CPC ............. *H01M 4/38* (2013.01); *H01M 4/582* (2013.01); *H01M 10/056* (2013.01); *H01M 10/36* (2013.01); *H01M 4/381* (2013.01); *H01M 2300/0017* (2013.01)

(58) Field of Classification Search
CPC ........ H01M 4/38; H01M 4/58; H01M 10/054; H01M 10/0563; H01M 10/20; H01M 10/22
See application file for complete search history.

(56) References Cited

U.S. PATENT DOCUMENTS

| | | | |
|---|---|---|---|
| 2,428,850 A | 10/1947 | Lawson | |
| 2,445,306 A | 7/1948 | Lawson | |
| 2,502,723 A | 4/1950 | Harriss | |
| 3,258,368 A | 6/1966 | Robinson et al. | |
| 3,531,328 A * | 9/1970 | Bro | H01M 6/16 429/145 |
| 4,060,676 A | 11/1977 | Dey et al. | |
| 4,409,303 A * | 10/1983 | Bowden | H01M 4/582 429/105 |

(Continued)

FOREIGN PATENT DOCUMENTS

| | | | | |
|---|---|---|---|---|
| WO | WO2012012743 | * | 1/2012 | ............. H01M 4/38 |
| WO | WO-2012012743 A1 | * | 1/2012 | ............ H01M 10/05 |

OTHER PUBLICATIONS

Park et al "A study of copper as a cathode material for an ambient temperature sodium ion battery", Nov. 2001.*

*Primary Examiner* — Uyen M Tran
(74) *Attorney, Agent, or Firm* — Dinsmore & Shohl LLP

(57) ABSTRACT

An electrochemical cell includes a metal containing anode M' capturing and releasing cations, a metal containing cathode M" and an electrolyte including an anion $X^-$ and a cation $M'^+$. During the charge process, the electrolyte allows reversible reactions wherein the anion dissociates from the electrolyte and reacts with the metal cathode forming $M''X_y$. At the same time, cations $M'^+$ from the electrolyte deposit on the anode side. The reverse process happens during the discharge process.

14 Claims, 8 Drawing Sheets

(56) References Cited

U.S. PATENT DOCUMENTS

| | | | | |
|---|---|---|---|---|
| 4,844,993 A * | 7/1989 | Chang | ............... | H01M 10/0563 |
| | | | | 252/182.1 |
| 5,637,421 A * | 6/1997 | Poehler | .................. | H01M 4/60 |
| | | | | 205/58 |
| 8,211,578 B2 | 7/2012 | Jiang et al. | | |
| 2004/0137324 A1* | 7/2004 | Itaya | .................... | H01M 4/505 |
| | | | | 429/188 |
| 2005/0139466 A1* | 6/2005 | Morris | ................ | B22D 17/007 |
| | | | | 204/280 |
| 2006/0257734 A1* | 11/2006 | Obata | .................... | H01M 4/24 |
| | | | | 429/206 |
| 2009/0029237 A1* | 1/2009 | Yazami | .................. | H01M 4/38 |
| | | | | 429/50 |
| 2011/0003207 A1* | 1/2011 | Oh | ..................... | H01M 4/0404 |
| | | | | 429/231.8 |
| 2011/0159381 A1* | 6/2011 | Doe | ....................... | H01M 4/13 |
| | | | | 429/337 |
| 2011/0244338 A1* | 10/2011 | Muldoon | ............... | H01M 4/46 |
| | | | | 429/324 |
| 2011/0262804 A1* | 10/2011 | Muldoon | ............. | H01M 4/134 |
| | | | | 429/207 |
| 2012/0009464 A1* | 1/2012 | Nakazawa | ............... | C25D 5/12 |
| | | | | 429/163 |
| 2013/0252112 A1* | 9/2013 | Doe | .................... | H01M 10/054 |
| | | | | 429/328 |

* cited by examiner

US 10,903,487 B2

METAL-METAL BATTERY

FIELD OF THE INVENTION

The invention relates to rechargeable batteries having a metal cathode and a metallic anode.

BACKGROUND OF THE INVENTION

Rechargeable batteries such as lithium ion and magnesium ion batteries have numerous commercial applications. Energy density is an important characteristic, and higher energy densities are desirable for a variety of applications. A magnesium ion in a magnesium or magnesium ion battery carries two electrical charges, in contrast to the single charge of a lithium ion. Improved electrode materials would be useful in order to develop high energy density batteries.

In the prior art, the general reaction for magnesium batteries for a cathode is based on traditional intercalation chemistry. The reversible intercalation of Mg ions may be determined by the crystal structure and limited redox activity or number of exchanged electrons of transition metals. Such limited redox activity may handicap the energy density of a battery system. There is therefore a need in the art for an improved battery that has an improved energy density and utilizes high energy density materials as the anode and cathode materials of the battery. There is also a need in the art for an electrolyte that is compatible with high energy density materials and allows for the transfer of ions in a battery.

SUMMARY OF THE INVENTION

In one aspect, there is disclosed an electrochemical cell that includes a metallic anode, a metal cathode and an electrolyte including an anion and a cation. The electrolyte allows reversible reactions wherein the cation dissociates from the electrolyte and deposits and or inserts to the anode during charging of the cell and the anion dissociates from the electrolyte and reacts with the metal cathode oxidizing the metal cathode.

In another aspect, there is disclosed an electrochemical cell that includes a metallic anode capturing and releasing cations, a metal chloride cathode and an electrolyte including an anion and a cation. The electrolyte allows reversible reactions wherein the cation migrates from the anode to the electrolyte during discharge of the cell, and the anion migrates from the cathode to the electrolyte during discharge of the cell.

In a further aspect, there is disclosed an electrochemical cell that includes a metal containing anode M' capturing and releasing cations, a metal containing cathode M" and an electrolyte including an anion X" and a cation M'$^+$. The electrolyte allows reversible reactions wherein the anion dissociates from the electrolyte and reacts with the metal cathode forming M"X$_y$.

In another aspect, there is disclosed an electrolyte for a battery having an anode and cathode. The electrolyte includes a compound of the formula M'QX wherein M' is a cation containing species corresponding to an anode of the battery, Q is an organic functional group and X is a halide ion containing species wherein X reacts with a cathode of the battery during charging of the battery forming a metal halide compound.

DETAILED DESCRIPTION OF THE PREFERRED EMBODIMENTS

Figure 1:
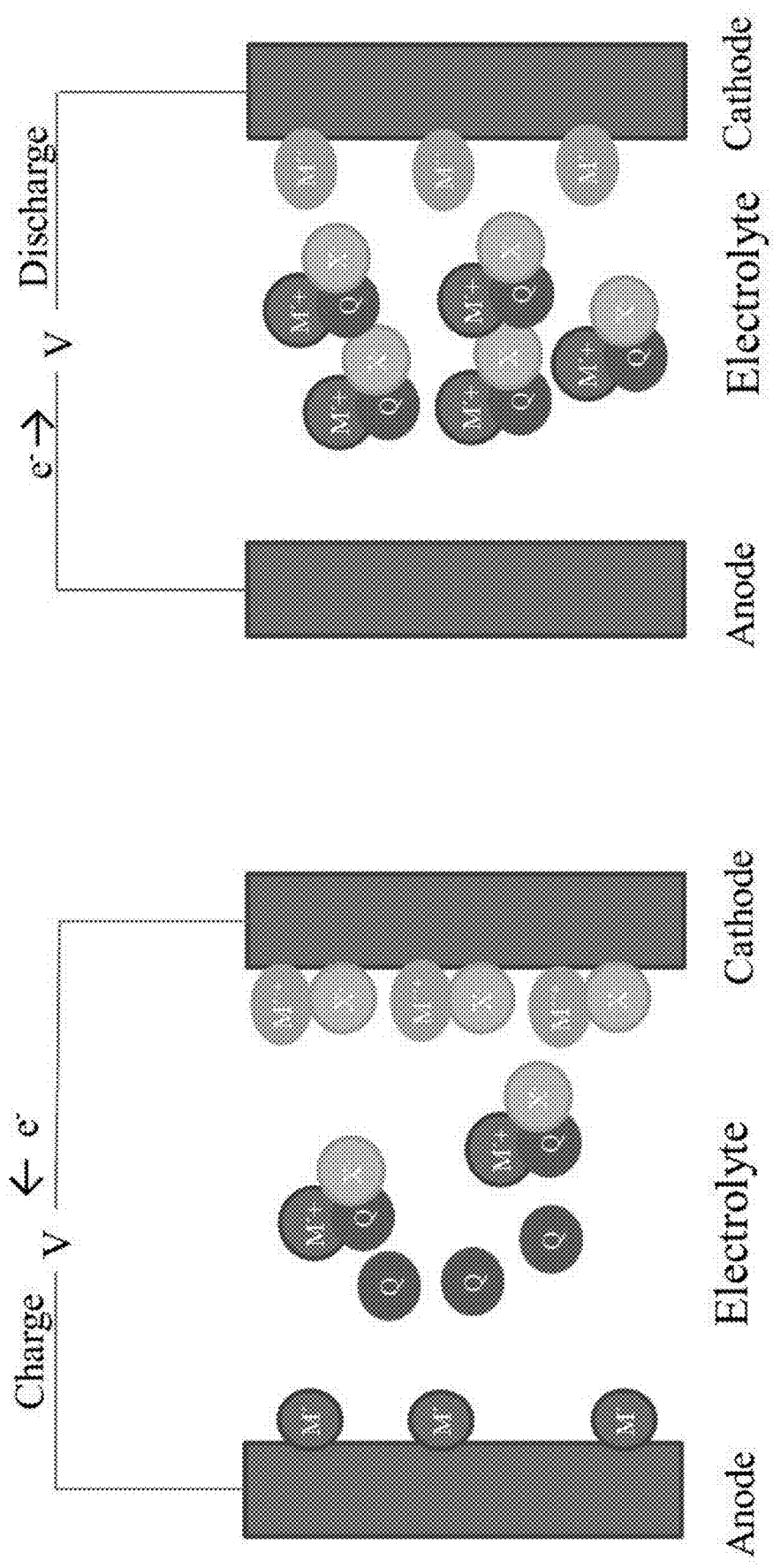
FIG. 1 is a diagram of a reaction mechanism for a battery including a metallic anode, an electrolyte and a metal cathode.

In one aspect, there is disclosed an electrochemical cell that includes a metallic anode capturing and releasing cations, a metal cathode and an electrolyte including an anion and a cation. The electrolyte allows reversible reactions wherein the cation dissociates from the electrolyte and deposits and or inserts to the anode during charging of the cell and the anion dissociates from the electrolyte and reacts with the metal cathode oxidizing the metal cathode. When the electrochemical cell discharges, the electrolyte allows reversible reactions wherein the cation migrates from the anode to the electrolyte and the anion migrates from the cathode to the electrolyte.

The electrochemical cell may be described such that the cell includes a metal containing anode M', a metal containing cathode M" and an electrolyte including an anion X$^-$ and a cation M'$^+$. The electrolyte allows reversible reactions wherein the anion dissociates from the electrolyte and reacts with the metal cathode forming M"X$_y$. Various metals having a difference in potential may be utilized as the anode and cathode of the electrochemical cell.

In one aspect, M" may be selected from 3d, 4d and 5d metals, such as Ag, Pb and Cu. Additionally, the cathode may be selected from M"F$_y$, M" Cl$_y$, M" Br$_y$, and M" I$_y$. M' may be selected from alkali metals, alkali earth metals and group IIIA metals such as Li, Na, K, Mg, Ca, and Al.

In another aspect, M" X$_y$ may be insoluble in the electrolyte and may be selected from AgCl, PbCl$_2$, and Cu$_2$Cl$_2$. Various anions may be present in the electrolyte. In one aspect, the anion X$^-$ may be selected from F$^-$, Cl$^-$, Br$^-$, I$^-$.

In one aspect, the electrolyte may include a compound of the formula M'QX wherein M' is a cation containing species corresponding to an anode of the battery, Q is an organic functional group and X is a halide ion containing species wherein X reacts with a cathode of the battery during charging of the battery forming a metal halide compound.

In one aspect, M' may be selected from Li, Na, K, Mg, Ca, and Al. X may be selected from F, Cl, Br, and I. Q may be selected from phenyl (Ph), and hexamethyldisilazide (HMDS).

EXAMPLES

Ag material was prepared by mechanical milling of AgF and carbon black (50:50 weight ratio) in a stainless steel vial with a ball to powder weight ratio of 20:1 for 2 hours using a high energy milling machine. During milling, AgF was decomposed to form Ag metal nanoparticles that were embedded in a carbon matrix.

The XRD analysis was carried out on a Rigaku diffractomer to examine the structure of the synthesized materials. Surface morphology and microstructure of the powders were characterized by scanning electron microscopy (SEM, JEOL). Electrochemical testing was performed in a Tom-cell with glassy carbon as a current collector. The electrode was prepared by mixing 70 wt. % as prepared Ag/C composite, 20 wt % KB and 10 wt % PTFE and then pressing to a 120 urn sheet. Two-electrode modified Tom cells were assembled in an Ar-filled dry box using an Mg foil as counter and reference electrodes, 0.4 M PhMgCl—AlCl$_3$ as an electrolyte and a glass fiber filter paper as a separator. The cycling was performed in the voltage region between 0.8 and 2.75 V vs. Mg/Mg$^{2+}$ at a constant current of 25 uA using a VMP battery testing system.

Figure 3:
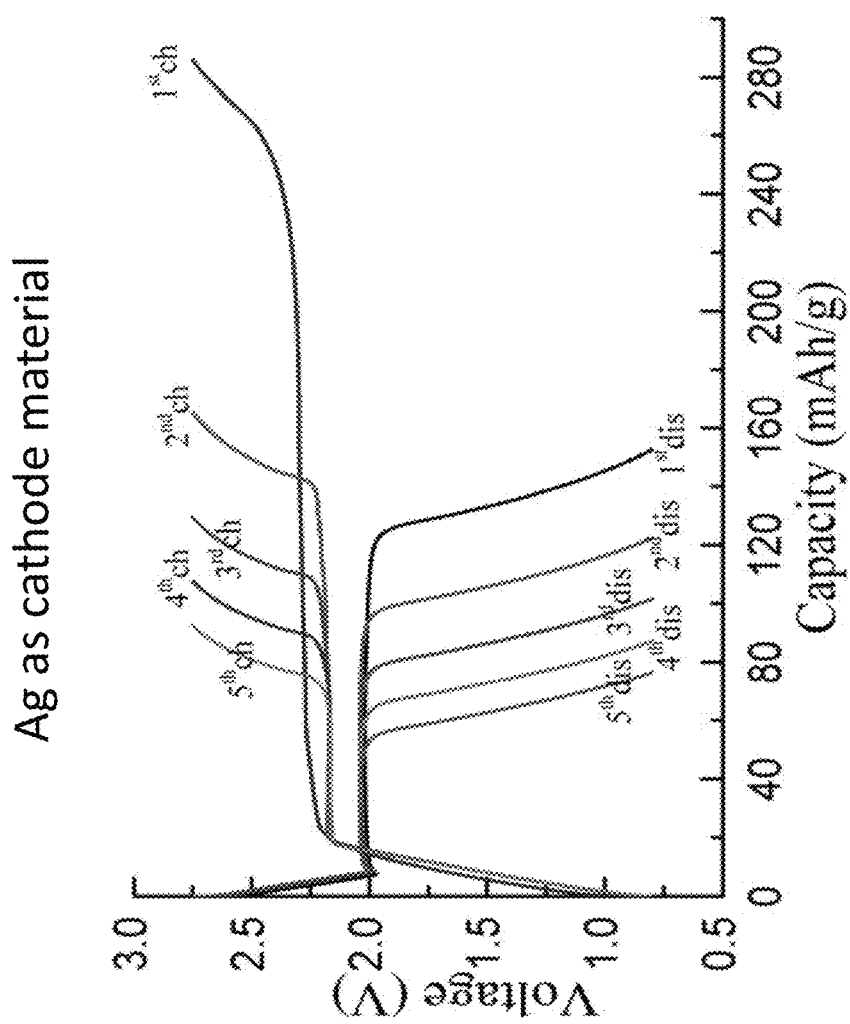
FIG. 3 is voltage profile of the battery of FIG. 2.

Referring to FIG. 3, there is shown the continuous charge and discharge curves of the Mg—Ag cell with the PhMgCl—AlCl$_3$ electrolyte. The capacity was calculated with pure Ag in the electrode. A plateau around 2.0 V was observed at both charge-discharge profiles. The plateau represents a surprising and improved cathode with so high and flat working potential in an Mg battery.

Figure 4:
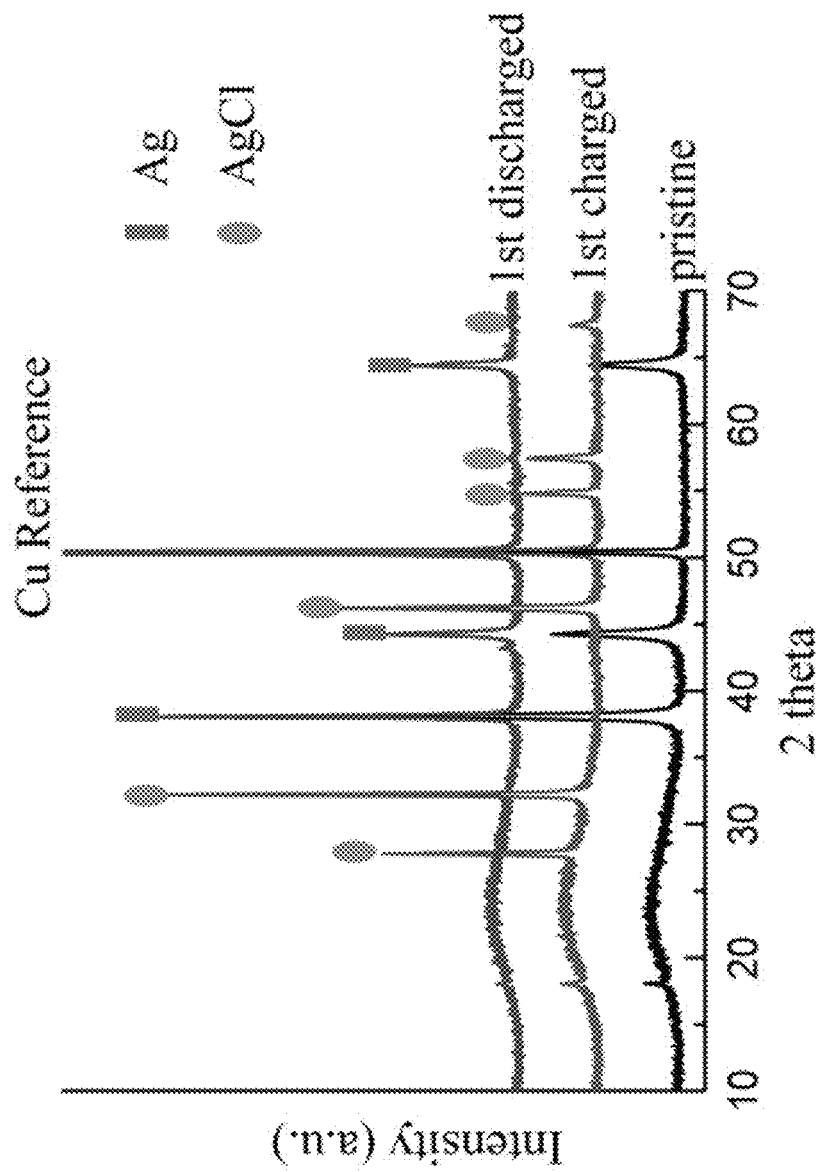
FIG. 4 is an XRD scan of the Ag cathode of FIG. 2.

An ex-situ XRD was carried out on the Ag electrode after first charge and discharge processes and the patterns are shown in FIG. 4. The patterns of the charged electrode could be indexed as Aga and the main peaks of the discharged electrode were ascribed to Ag again. The XRD study suggested the overall reaction on the Ag electrode was:

$$Ag + Cl^- \leftrightarrow AgCl + e^-$$

The corresponding overall reaction on Mg anode was:

$$Mg^{2+} + 2e^- \leftrightarrow Mg$$

Figure 5:
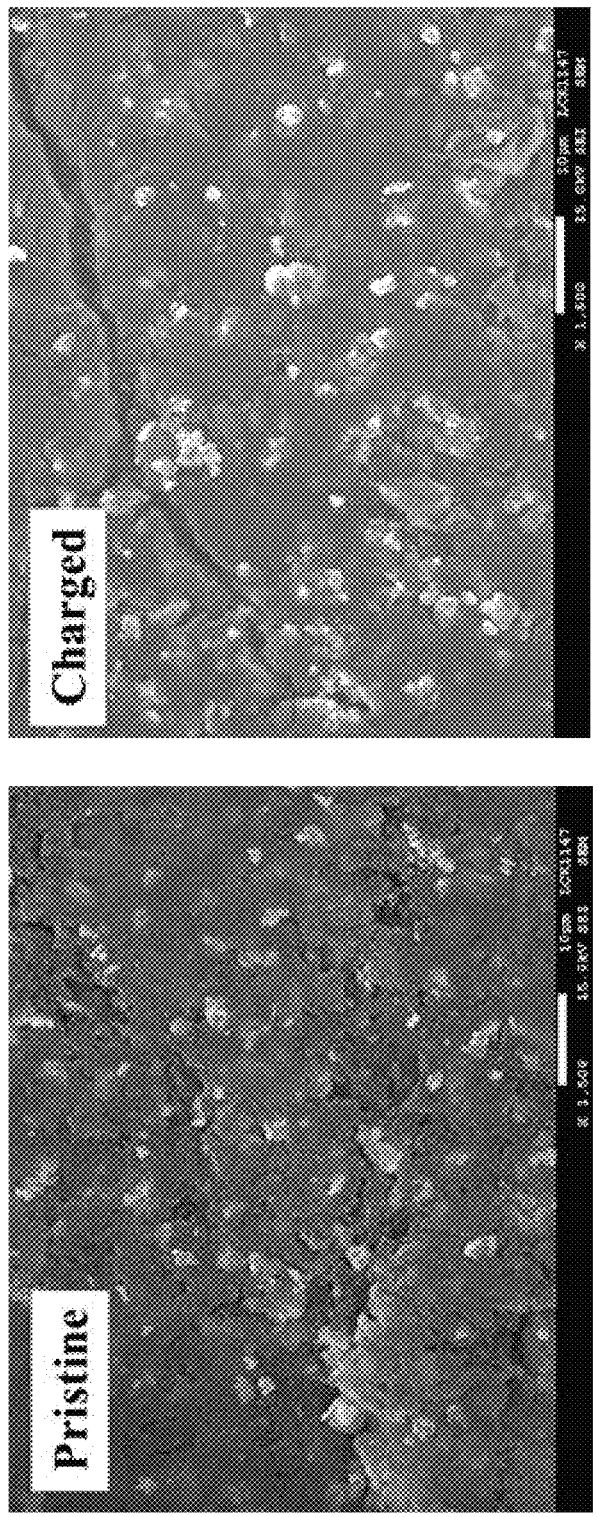
FIG. 5 is an SEM image of a pristine and charged Ag cathode of FIG. 2.

Referring to FIG. 5, there is shown SEM images of the Ag electrode before and after charge. The bright points in the pristine electrode were micro sized Ag particles embedded in the carbon matrix. After charging, the edge of Ag particle slightly changed because of the formation of AgCl.

The reactions of the Mg—Ag cell were very different from a classical rocking chair cell where metal ions (such as Li$^+$, Mg$^{2+}$) are transferred between cathode and anode during cycling and where the electrolyte functions as a media to carry the metal ions. In the electrochemical cell of the present invention, both cations and anions from the electrolyte participate in the charge and discharge reactions. During the charge process, Cl$^-$ ions dissociated from the electrolyte and moved to the cathode side and then formed AgCl. At the same time, the corresponding Mg$^{2+}$ ions transported to the anode side and deposited as Mg metal.

During the discharge process, Mg$^-$ and Cl$^-$ returned to the electrolyte. On discharge, cations and anions are released back into the electrolyte. In one aspect, the electrochemical cell of the present invention as embodied in the example of an Mg—Ag cell may be referred to as a dual-ion cell system. FIG. 1 details the electrolyte reaction during charge and discharge processes for the Mg—Ag cell.

Figure 2:
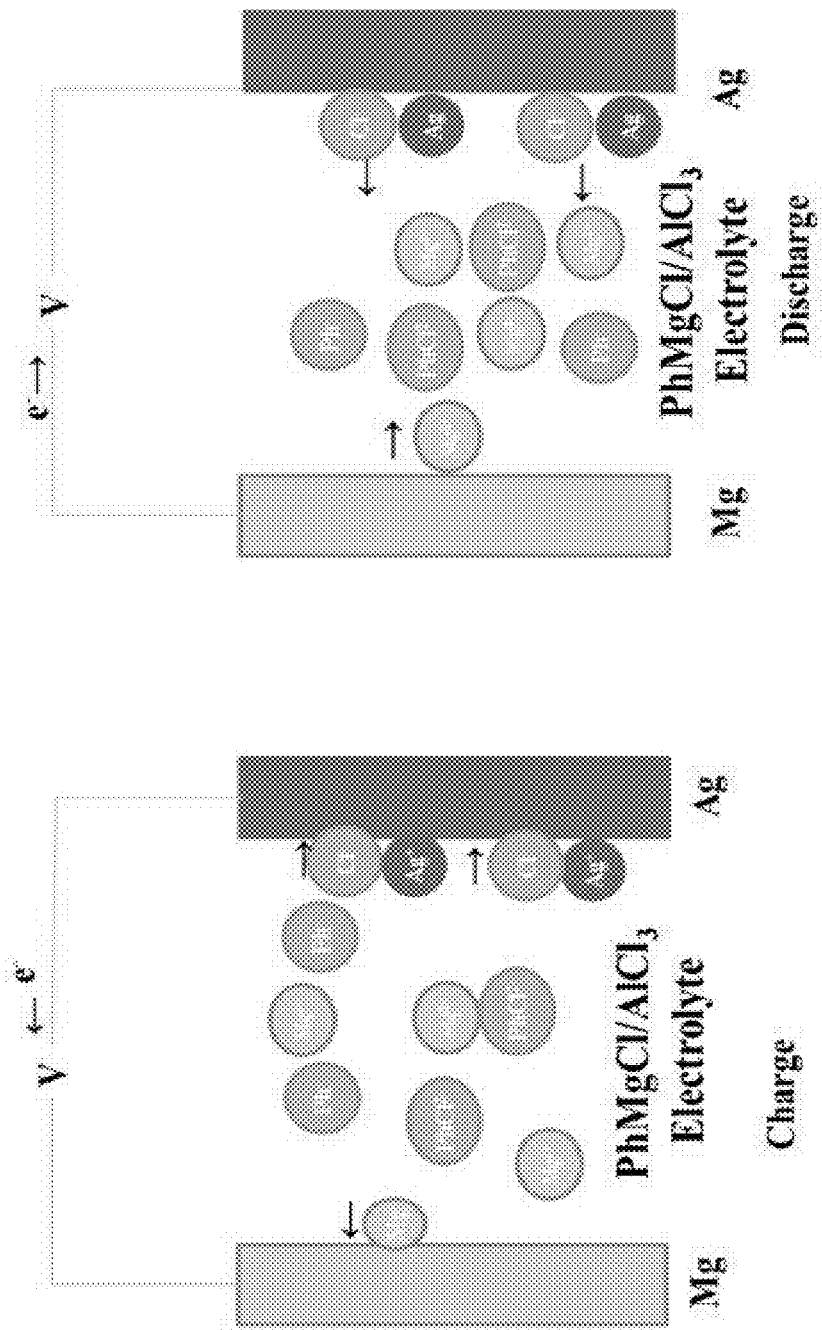
FIG. 2 is a diagram of an example of the metal-metal battery including an Mg anode, an electrolyte of PhMgCl—AlCl3 and an Ag cathode.

A calculation of the working potential V of the cell Mg/PliMgCl—AlCl$_3$/Ag may be described in following equations:

anode: $Mg^{2+}(solution) + 2e^- \rightarrow Mg(s)$ cathode: $Ag(s) + Cl^-(solution) \rightarrow AgCl(s) + e^-$ $V = -\Delta G/2e$ $\Delta G = G_{Mg,solid} + 2G_{AgCl,solid} - G_{Mg^{2+},solution} - G_{Cl^-,solution} - G_{Ag,solid}$ $\Delta G = \{G_{Mg,solid} + 2G_{AgCl,solid} - G_{Ag,solid} - G_{MgCl_2,solid}\} + \{G_{MgCl_2,solid} - G_{Mg^{2+},solution} - G_{Cl^-,solution}\}$ $\Delta G = \Delta G_1 + \Delta G_2$ $\Delta G_1$ is a Gibbs free energy change for a solid reaction $MgCl_2 + Ag \rightarrow Mg + AgCl$ $\Delta G_2$ is a Gibbs free energy change for MgCl$_2$ to crystalize from the solution $Mg^{2+} + 2Cl^- \rightarrow MgCl_2$ $\Delta G_2 = G_{MgCl_2,solid} - (G_{Mg^{2+}}^0 + RT \ln \alpha_{Mg^{2+}}) - 2(G_{Cl^-}^0 + RT \ln \alpha_{Cl^-})$ $\Delta G_2 = \{G_{MgCl_2,solid} - G_{Mg^{2+}}^0 - 2G_{Cl^-}^0\} - RT \ln \alpha_{Mg^{2+}} \alpha_{Cl^-}^2$ $\Delta G_2 = \{G_{MgCl_2,solid} - G_{Mg^{2+}}^0 - 2G_{Cl^-}^0\} + RT \ln x_{Mg^{2+}} x_{Cl^-}^2 - RT \ln r_{Mg^{2+}} r_{Cl^-}^2$ $V = V_1 + V_2^0 + RT \ln x_{Mg^{2+}} x_{Cl^-}^2 + RT \ln r_{Mg^{2+}} r_{Cl^-}^2$ $V_1 : 2.005v$ V may be related with the concentration and activity of Mg$^{2+}$ and in the electrolyte. As shown in the voltage profiles of FIG. 2, which have a plateau at 2 V, that indicates both Mg$^{2+}$ and Cl$^-$ maintained a stable concentration and activity during charge and discharge processes.

Figure 6:
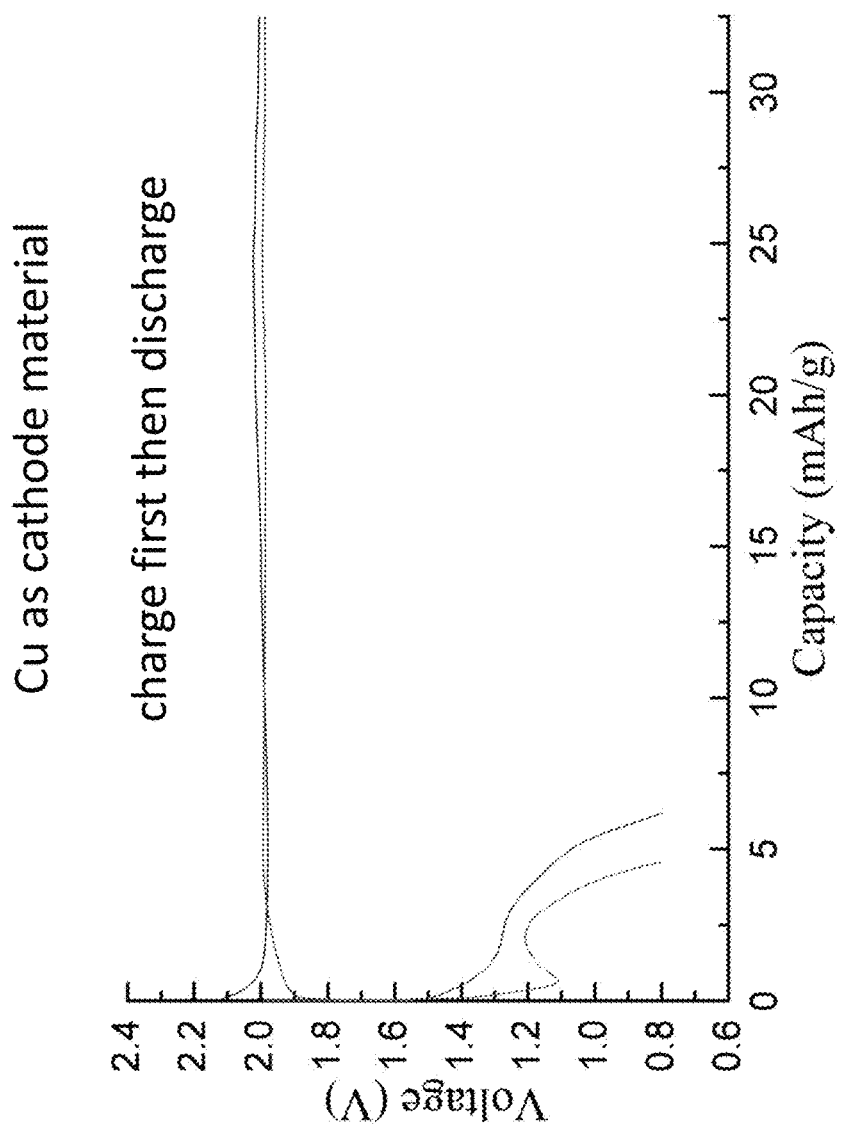
FIG. 6 is voltage profile of a battery including a Mg anode an electrolyte of PhMgCl—AlCl$_3$ and a cathode of Cu.
Figure 7:
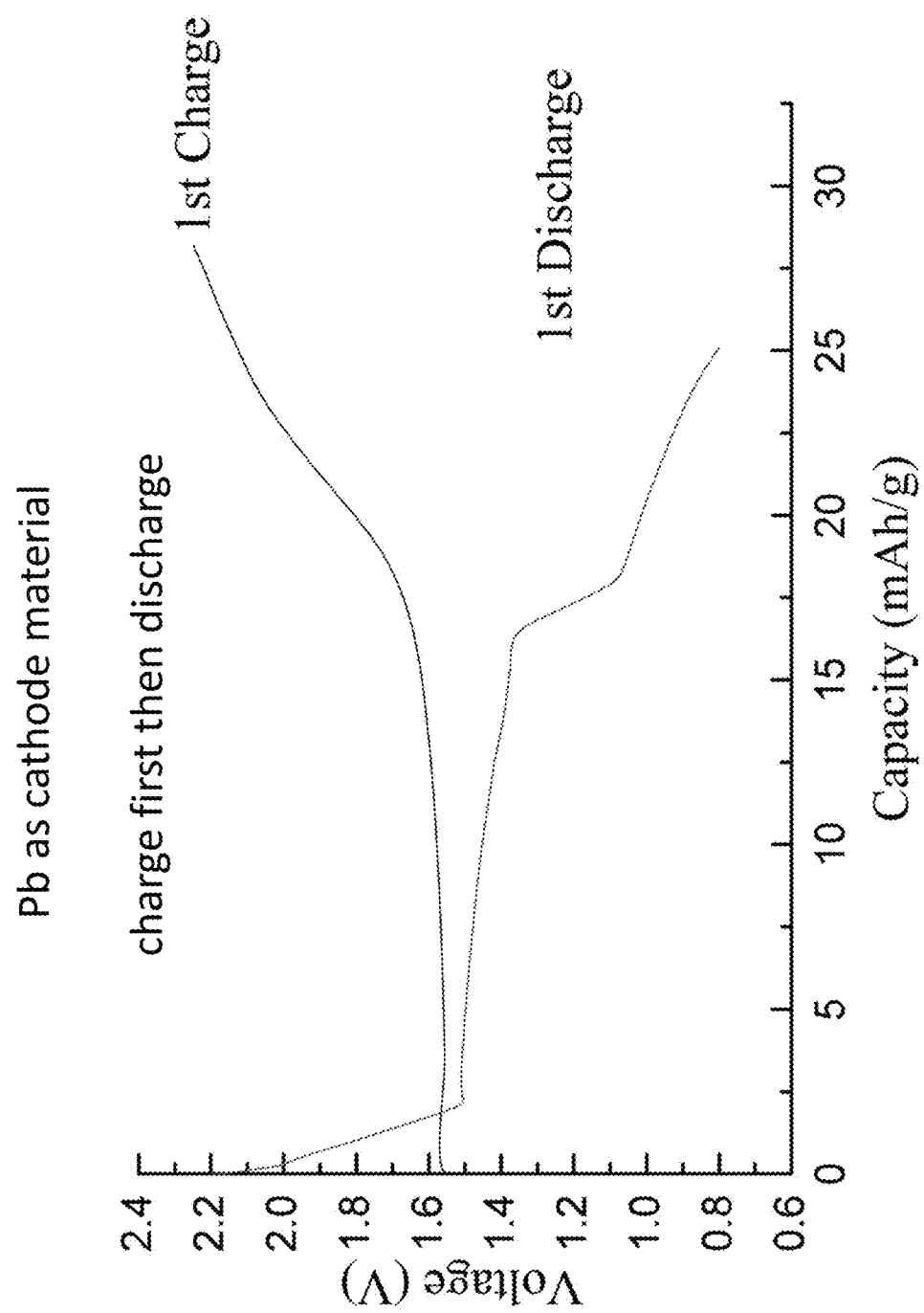
FIG. 7 is voltage profile of a battery including a Mg anode an electrolyte of PhMgCl—AlCl$_3$ and a cathode of Pb.
Figure 8:
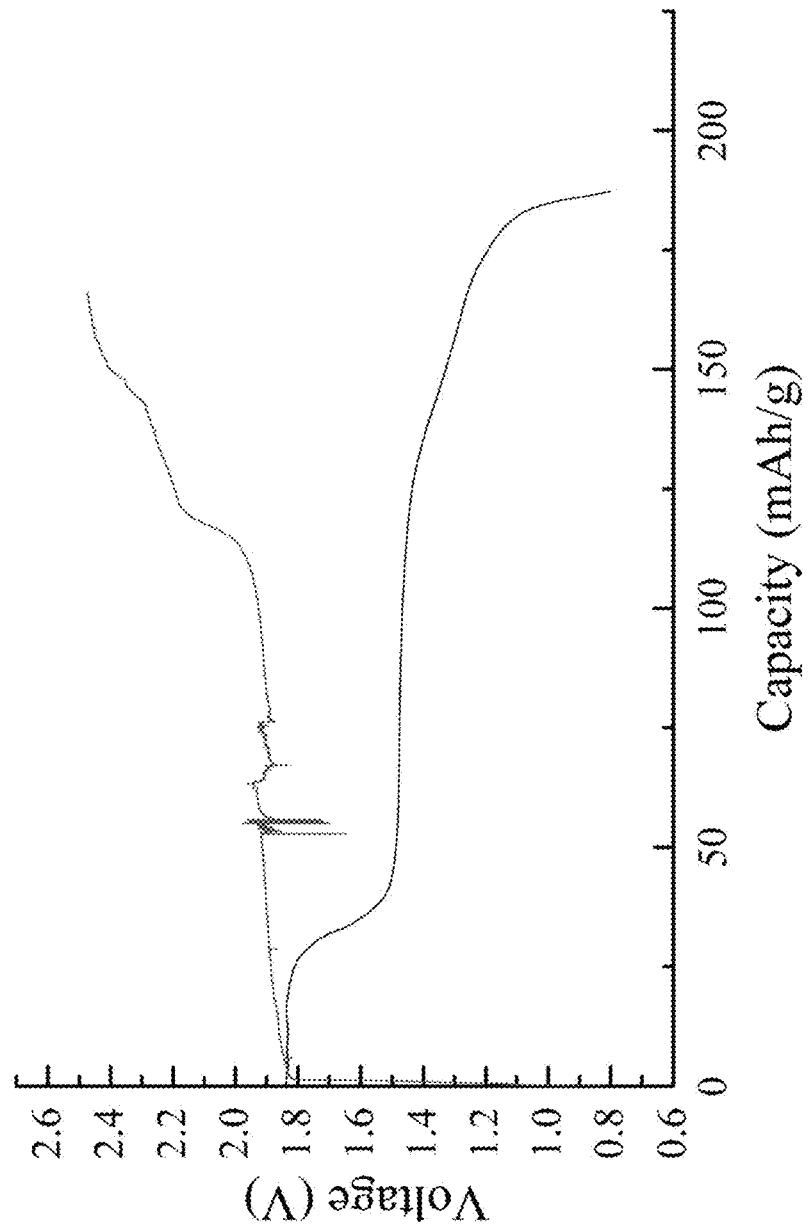
FIG. 8 is voltage profile of a battery including an Mg anode an electrolyte of PhMgCl—AlCl$_3$ and a cathode of CuCl.

Cu, Pb and CuCl cathodes were prepared as described above with the Ag cathode. Mg metal was utilized as an anode material with PhMgCl—AlCl$_3$ as an electrolyte. The cyclic voltage profiles are shown in FIGS. 5-7. As can be seen in FIG. 5, Cu displays a charge and discharge plateau at around 2V, indicating reversible cycling and stability of the electrochemical cell. Further as shown in FIG. 6, Pb displays a charge and discharge plateau at around 1.6V, indicating reversible cycling and stability of the electrochemical cell. Referring to FIG. 7, CuCl displays a charge and discharge plateau at around 1.9V, indicating reversible cycling and stability of the electrochemical cell.

The invention is not restricted to the illustrative examples described above. Examples described are not intended to limit the scope of the invention. Changes therein, other combinations of elements, and other uses will occur to those skilled in the art. The scope of the invention is defined by the scope of the claims.

Having described our invention, we claim:

1. An electrochemical cell comprising:
   a magnesium containing anode structured to capture and release cations;
   a metal cathode comprising a metal selected from 3d, 4d and 5d metals;
   a non-aqueous organic electrolyte for the magnesium containing anode and the metal cathode including an anion and a magnesium cation;
   wherein, in a charged state, at least a portion of the magnesium cation from the non-aqueous organic electrolyte is present at the magnesium containing anode and the metal cathode comprises a reactant formed from oxidizing the metal cathode with the anion of the non-aqueous organic electrolyte, and the electrochemical cell has a discharge plateau from 1.6V to 2V.

2. The electrochemical cell of claim 1,
wherein, in a discharged state, the magnesium cation and the anion are present in the non-aqueous organic electrolyte.

3. An electrochemical cell comprising:
a magnesium containing anode structured to capture and release cations M';
a metal containing cathode M";
a non aqueous organic electrolyte for the magnesium containing anode and the metal containing cathode including an anion $X^-$ and a magnesium cation $M'^+$;
wherein, when in the charged state, the metal containing cathode comprises $M"X_y$,
M" is selected from 3d, 4d and 5d metals, and
the electrochemical cell has a discharge plateau from 1.6V to 2V.

4. The electrochemical cell of claim 3 wherein $M"X_y$ is insoluble in the non-aqueous organic electrolyte.

5. The electrochemical cell of claim 3 wherein M" is selected from Ag, Pb and Cu.

6. The electrochemical cell of claim 3 wherein $X^-$ is selected from $F^-$, $Cl^-$, $Br^-$, $I^-$.

7. The electrochemical cell of claim 3 wherein the metal containing cathode is selected from $M"F_y$, $M"Cl_y$, $M"Br_y$, $M"I_y$.

8. The electrochemical cell of claim 3 wherein $M"X_y$ is selected from AgCl, $PbCl_2$, and $Cu_2Cl_2$.

9. The electrochemical cell of claim 3 wherein $M'^+$ dissociates and deposits and or inserts to the magnesium containing anode during charging of the electrochemical cell.

10. The electrochemical cell of claim 3 wherein $M'^+$ migrates from the magnesium containing anode back to the non-aqueous organic electrolyte during discharge of the electrochemical cell.

11. The electrochemical cell of claim 3 wherein $X^-$ migrates from the metal containing cathode back to the non-aqueous organic electrolyte during discharge of the electrochemical cell.

12. The electrochemical cell of claim 1 wherein
the metal cathode comprises a member selected from the group consisting of Ag, Pb, and Cu.

13. The electrochemical cell of claim 12 wherein, in the charged state, the metal cathode comprises a metal halide.

14. The electrochemical cell of claim 12 wherein the non-aqueous organic electrolyte is $PhMgCl—AlCl_3$.

* * * * *

UNITED STATES PATENT AND TRADEMARK OFFICE
CERTIFICATE OF CORRECTION

PATENT NO. : 10,903,487 B2
APPLICATION NO. : 13/870799
DATED : January 26, 2021
INVENTOR(S) : Ruigang Zhang, Chen Ling and Fuminori Mizuno It is certified that error appears in the above-identified patent and that said Letters Patent is hereby corrected as shown below:

In the Specification

In Column 1, Line(s) 56, delete "X''" and insert --X$^-$--, therefor.

In Column 3, Line(s) 13, before "sheet", delete "urn" and insert --μm--, therefor.

In Column 3, Line(s) 30, delete "Aga" and insert --AgCl--, therefor.

In Column 3, Line(s) 54, delete "Mg$^-$" and insert --Mg$^{2+}$--, therefor.

In Column 3, Line(s) 62, delete "Mg/PliMgCl—AlCl$_3$/Ag" and insert --Mg/PhMgCl-AlCl$_3$/Ag--, therefor.

In Column 3, Line(s) 64, delete "Mg$^{2+}$(solution)+2e$^-$Mg(s)" and insert --Mg$^{2+}$(solution)+2e$^-$→Mg(s)--, therefor.

In Column 4, Line(s) 31, after "and", insert --Cl$^-$--.

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*